Figure 1:
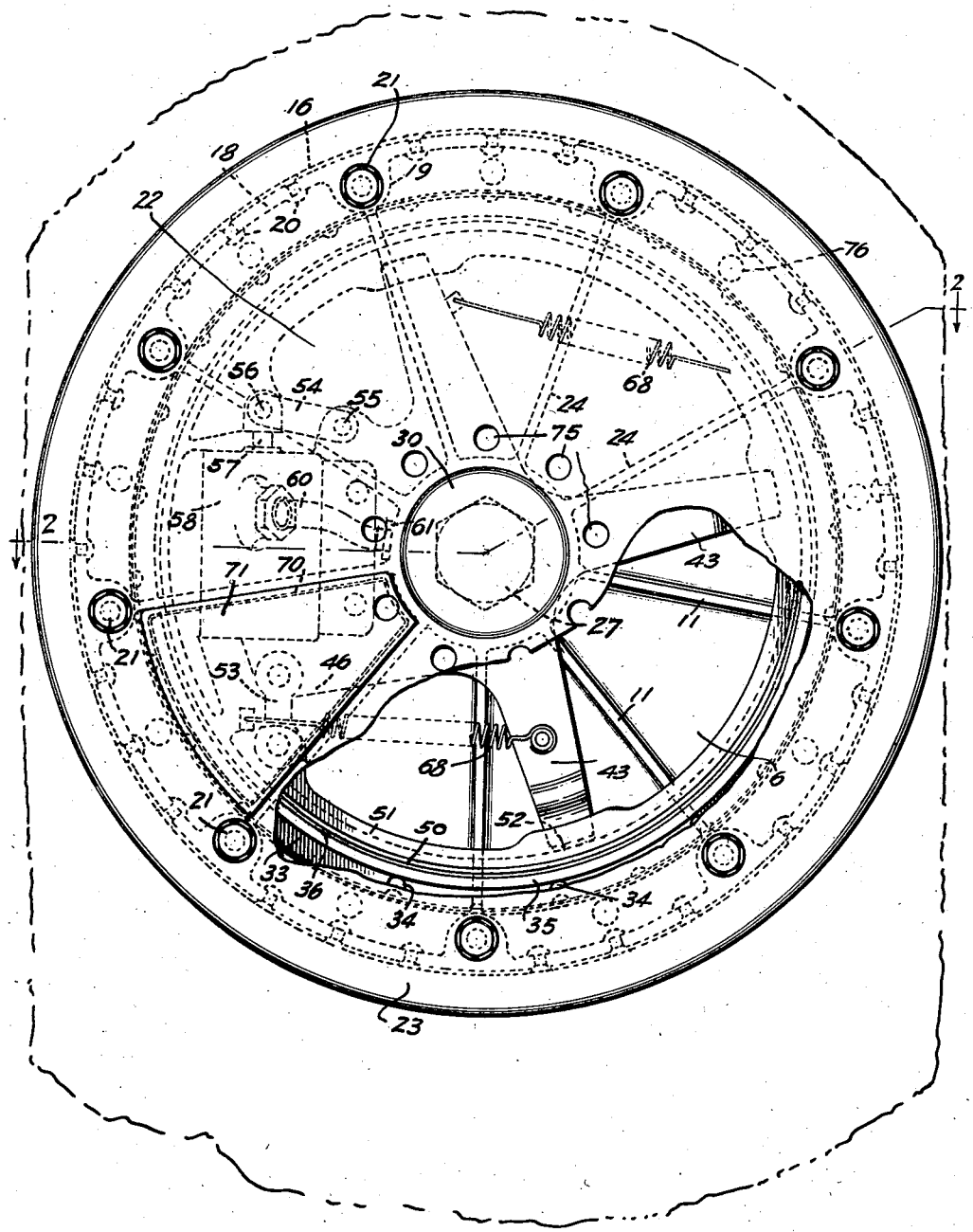

Dec. 16, 1941.  J. A. ROCHÉ  2,266,079
WHEEL WITH CENTRAL BRAKE
Filed July 2, 1940   2 Sheets-Sheet 1

INVENTOR
JEAN A. ROCHÉ
BY
ATTORNEYS

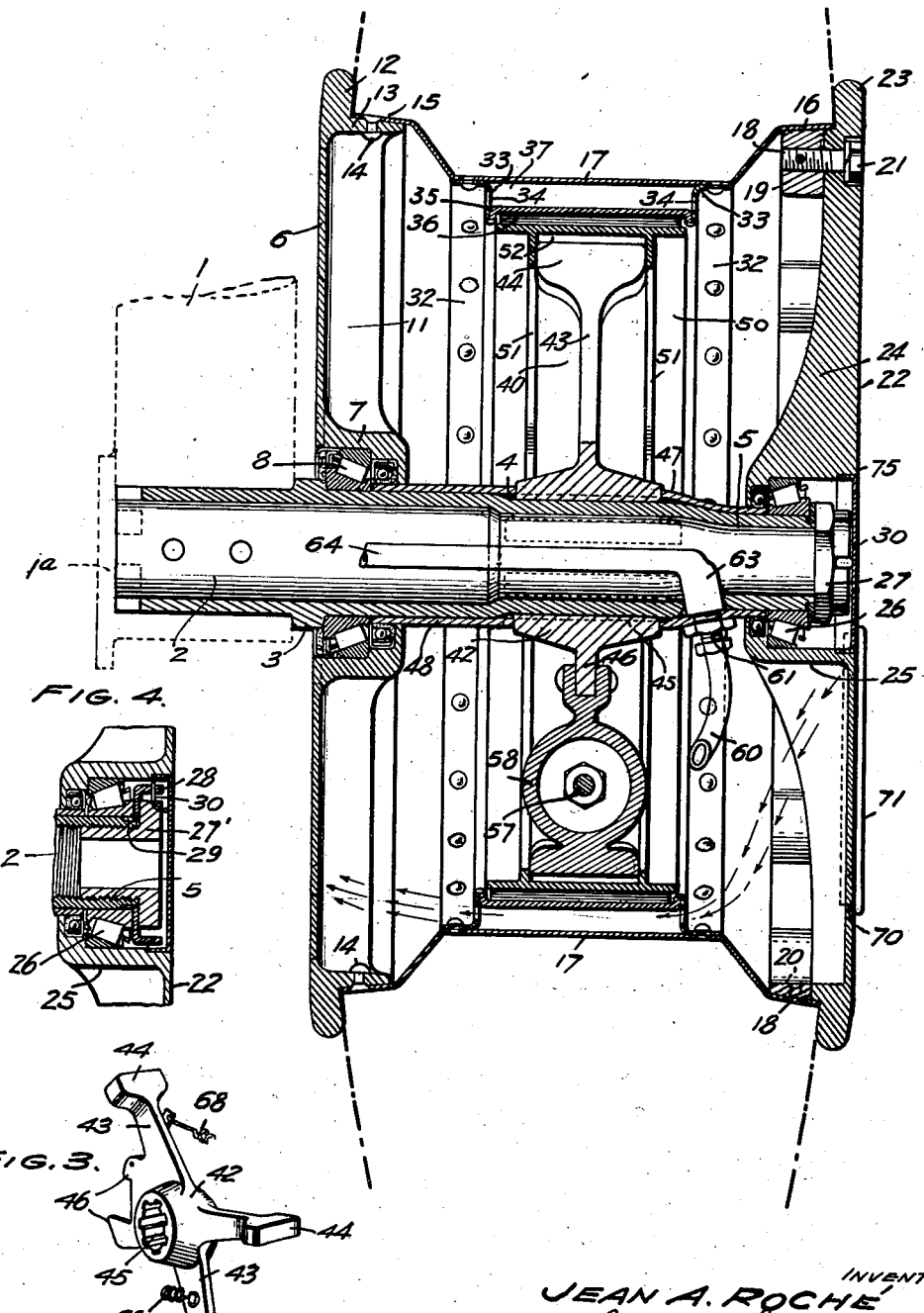

Patented Dec. 16, 1941

2,266,079

UNITED STATES PATENT OFFICE 2,266,079

WHEEL WITH CENTRAL BRAKE

Jean A. Roché, Langley Field, Va.

Application July 2, 1940, Serial No. 343,565

3 Claims. (Cl. 188—18)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a novel wheel and brake assembly having a particular utility for use on aircraft though not limited thereto.

In aircraft wheel and brake assemblies now in use, great difficulty is experienced in obtaining an adequate braking surface since the present brakes are usually mounted external of the wheel within a recess in the wheel hub, so that increase of brake width and area is limited by the fact, that the increase of brake width causes an eccentricity of the load supporting portions of the wheel and thus increases the liability of wheel failure under heavy wheel, or side load stresses. This difficulty is overcome in accordance with the invention by constructing the wheel in the form of spaced forged or cast discs, or side members, rotatably mounted on the axle and having the rim, or annular tire supporting member extending laterally between the side members. Within the wheel a laterally extending brake drum is secured to the rim or tire supporting member in concentric relation thereto and the inner surface of the brake drum forms a braking surface adapted to cooperate with internal expanding brake shoes supported by a central spider secured to the axle. The spider also serves as a support for the fluid pressure brake motor and the brake shoe retracting springs. The spider is provided with radial arms which serve as guides for the brake shoes and further serve as a means to support the tire supporting member under loads sufficient to cause an appreciable deformation of the said member. The brake drum and shoes are arranged substantially symmetrically with respect to the vertical centerline of the wheel and the brake shoes apply a substantially radial pressure on the brake drum and introduce no appreciable bending moment into the side members.

It is thus seen that in the improved structure above described no limitation is placed on the size of the brake except the space between the side members and the inner diameter of the tire supporting member, so that a brake of adequate dimensions may be secured in a wheel of maximum strength.

A further feature of the invention is the provision in a wheel of the type above described of an annular brake drum having an outside diameter less than the inside diameter of the tire supporting rim and secured to the rim in a manner to permit a free circulation of air from the space within the wheel through the space between the brake drum and the rim to prevent the transmission of heat through the rim to the tire and in wheels of large size, to provide for admission of air adjacent the axle and for discharge of air adjacent the outer periphery of the wheel, the radial bracing webs on the wheel side members forming a centrifugal pump to create a circulation of air over the brake drum and associated parts.

The principal object of the invention is the provision of a brake and wheel assembly in which the wheel is formed of a pair of spaced side members rotatably mounted on the axle and secured to a tire supporting rim located between the side members, the wheel enclosing a lateral annular brake drum secured to the tire supporting rim and disposed substantially symmetrically with respect to the vertical median line of the wheel and the provision of internal brake mechanism supported by the axle for applying a radial braking pressure to the inner surface of the brake drum.

A further object of the invention is the provision in a wheel and brake assembly of the type described of a means to minimize the transmission of heat from the annular brake drum to the tire supporting rim.

A further object of the invention is the provision in a wheel of the above described type of an extension of the side members beyond the rim to form tire retaining rim flanges and of a means to detachably connect, the outer side member to an annular ring, rigidly secured to the rim, whereby a tire may be rapidly mounted and demounted.

A further object of the invention is the provision in a wheel and brake assembly of the type described of a structure forming a centrifugal pump, to create a current of cooling air over the internal brake drum and its associated parts.

A further object of the invention is the provision of an arrangement of the brake supporting structure and wheel side members that the brake operating mechanism may be readily disconnected and the entire wheel quickly removed from the axle.

A further object of the invention is the provision in a wheel and brake assembly of the type described of a hand hole through the outer side member to facilitate the manual adjustment of the brake without removal of the wheel.

Other features and objects of the invention, not specifically set forth above, will become apparent by reference to the following detailed description and the appended drawings in which:

Figure 1 is a side elevation of the wheel and brake construction according to the invention, a portion of the outer side member being broken away to show the internal construction; and Figure 2 is a sectional view taken on line 2—2 of Figure 1; and Figure 3 is an isometric view of the central brake supporting spider; and Figure 4 is a detail of a modified means for retaining the wheel of Figure 1 on the axle.

Referring now to the devices illustrated in

Figures 1 to 3 inclusive, the numeral 1 represents a landing gear strut provided with a socket fitting 1a, at the lower end thereof and in which is socketed a conventional hollow stub axle 2. The stub axle 2 is provided adjacent its inner end with a wheel retaining flange 3 and adjacent its outer end is reduced in diameter, as indicated at 5. Between the outer end 5 and the wheel seat 3, the stub axle 2 is provided with a plurality of longitudinally extending splines 4, the purpose of which will hereinafter be described. A wheel side member 6 having a central enlarged hub 7 is rotatably mounted on the axle 2 by means of a conventional type roller bearing 8, which is retained within suitable counterbores in the hub 7. The wheel side member 6 is made in the form of a thin metal disc braced by radially extending web members 11, which stiffen the side member and assist in transmitting radial loads to the hub 7 and bearing 8. Adjacent its outer periphery, the side member 6 is provided with a laterally extending flange 13 and an enlarged radially extending portion 12, the function of which is to serve as a tire retaining rim flange. The annular flange 13 is secured by rivets 14, to a flanged extension 15, of an annular deep-well type of tire supporting rim 17. The tire supporting rim 17, is provided adjacent its outer end with an annular flange 16, similar to the flange 15, and the flange 16 is secured by rivets 20 to an annular ring 18 having enlarged threaded bosses 19 formed integral therewith. A second wheel side member 22 is detachably secured to the annular ring 18 by means of bolts 21, which thread into the bosses 19. The side member 22 is provided with an enlarged radially extending portion 23, which serves the function of a rim flange similar to the portion 12 of the side member 6. The wheel side member 22 is provided with a central enlarged boss 25 suitably counterbored for a bearing 26 of the same type as bearing 8. A nut 27, threaded on the end of axle 2 within the counterbore of the side member 22, serves to retain the wheel in its assembled relation on the axle 2. The wheel side member 22, is provided with radially extending webs 24 to stiffen the same against radial loads in the same manner as the previously described side member 6. The counterbore in the hub 25 is closed by a removable cover plate 30, which also allows access to the nut 27 for removing the same.

The side members 6 and 22, in conjunction with the deep-well rim 17, form a complete wheel assembly. A pair of annular flanged rings 32, having inwardly directed flanges 33, are riveted in spaced relation to the inner side of the wheel rim 17. The inwardly directed flanges 33 are pierced by a plurality of holes 34, which serve as ventilating holes in a manner hereinafter more particularly described. An annular brake drum 35 is secured to the inwardly directed flanges 33 at the outer portions thereof, preferably by welding or otherwise. This construction thus provides an air space 37 between the rim 17 and the annular brake drum 35. The inner annular surface of the brake drum 35 is adapted to be contacted by an annular ring of brake lining material 36 to form the well-known Hawley brake in which the brake lining is freely floating. The brake drum 35 is arranged so as to be symmetrically disposed with respect to the vertical medium line of the wheel assembly.

A spider, generally indicated by the reference numeral 40, is provided with a central hub portion 42, having internal splines 45, and is mounted on the central spline portion 4 of the axle 2, and retained in a central portion by means of spacers 47 and 48 which abut the hub 42 on either side thereof and extend within the respective hubs 7 and 25 in contact with the inner races of the respective bearings 8 and 26. The spider 40 is thus non-rotatable with respect to the axle 2 and is provided with a plurality of radially extending arms 43 having enlarged guide portions 44 at their outer ends. The guide portions 44 serve as radial guides for an annular flexible brake shoe, generally indicated by the reference numeral 50. The brake shoe 50 is provided with inwardly directed flanges 51 which straddle the guide portions 44 and serve to allow free radial expansion of the brake shoe 50 but retain the brake shoe from lateral motion relative to the spider 40 a small clearance space 52 between the shoe and the outer periphery of the radial guides 44. The spider 40 is provided with a vertically extending web 46 to which is secured the pivotal links 53 and 54, which in turn are connected to the opposite ends of the brake shoe 50. The upper link 54 is pivoted as at 55 to the web 46 and at its outer end is secured by a pivot 56 to the brake shoe 50, pivot 56 also serving as a connection for the piston rod 57 of a hydraulic fluid pressure brake motor 58, which is also mounted on the web 46 by means of rivets or the like. A flexible fluid pressure conduit 60, having a removable coupling 61 at its inner end, is connected through a transverse bore in the axle 2 to a fitting 63 secured within the hollow axle 2 as by brazing. The fitting 63 is adapted to be connected to a suitable fluid pressure conduit 64 which passes through the hollow axle 2 and may be connected to any suitable source of fluid pressure, not shown. At its outer end, the conduit 60 is connected to the fluid pressure brake motor 58 to supply fluid pressure thereto. Conventional brake shoe retracting springs 68, anchored at their inner ends to the arms 43 of the spider 40, serve to retract the brake shoe 50 from contact with the brake lining material 36. Upon application of fluid pressure to the motor 58, the brake shoe 50 will expand and contacting brake shoe lining 36 will cause a radial braking pressure to be applied to the braking surface of the brake drum 35.

In order to render the brake adjustable from the exterior of the wheel, the outer wheel side member 22, is provided with an opening or hand hole 70, which may be closed by a removable snap cover 71, shaped to fit the opening and to lie nearly flush with the outer surface of the side member. It will be noted by inspection of Figure 2, that by removing the snap cover 30, the nut 27 may be removed and by removing the snap cover 71 and unscrewing the conduit coupling 61, the entire wheel including spider 40 and spacers 47 and 48 may be removed in assembled relation without removing the tire, thus permitting rapid mounting and demounting of the wheel from the axle.

It will be noted that the space 37 between the brake drum 35 and the wheel supporting rim 17 serves as a ventilating space to thus prevent the major portion of the heat developed in the brake drum 35 from being directly transmitted to the deep-well portion of the rim 17, to thereby cause excessive heating of the tire inner tube. While this construction permits a free circulation of air between the chamber 37 and the interior of the wheel in large heavy loaded wheels where the braking loads are apt to be excessive, it is desirable to incorporate means providing an additional supply of cooling air. The entrance of this additional supply of cooling air to the interior of the wheel is provided by means of a series of ports 75 drilled through the outer side member 22 adjacent the hub 25 thereof. A means to discharge heated air from the interior of the wheel is provided by a plurality of ports 76 drilled through the inner side member 6 adjacent the outer ends of the webs 11. It will be seen that when the wheel assembly is rapidly rotating, that the radial webs 11 and 24 of the wheel side members 6 and 22 respectively, will form in effect a centrifugal air pump, tending to create an increased pressure at the outer periphery of the wheel and to create a reduced air pressure within the wheel adjacent its axis of rotation. Since the air under pressure may escape through the ports 76, a continual circulation of air from the outside atmosphere through the port 76, through the chamber 37 and adjacent brake structure, towards the discharge ports 76 will take place in the manner indicated by the arrows in Figure 2. This stream of air will further insure adequate cooling of the brake drum and associated brake lining and brake shoe, greatly adding to their service life.

From the above described construction, it is obvious that the only limitation on the size of brake employed is the spacing between the wheel side members 6 and 22, respectively, and the diameter of the brake drum 35 which is limited only by the diameter of the well portion of the rim 17. These limitations are such, however, that a brake of much larger dimensions than has heretofore been used in the art is possible and the structure, in accordance with the invention, is a solution to the problem of obtaining an adequate braking surface without the usual eccentricity of the load supporting portions of the wheel, relative to the plane of application of the vertical wheel load. The construction further is adapted to forged construction of the wheel side members, the integral internal radial webs adding greatly to the resistance of the side members to side loads imposed upon the wheel structure. The invention further has the advantage that by removal of the wheel retaining nut 27, the entire wheel in assembled relation may be removed from the axle. The construction, in accordance with the invention, further simplifies the problem of rapidly mounting and demounting tires, since by removal of the screws 21 and the nut 27, the side member 22 may be removed from the wheel, allowing a tire to be readily mounted and demounted. When replaced, the flange 23 of the side member 22 again serves its usual function of a tire retaining rim flange.

The construction of the brake mechanism per se and the means for supplying fluid pressure to actuate the brake form no part of the present invention, since other types of brake mechanism than those specifically illustrated are suitable for use with the structure in accordance with the invention.

In addition to the spider 40 serving as a support for the brake shoe 50 in the event of an excessive wheel load occurring of such a magnitude as to cause a partial collapse of the wheel an amount equal to the clearance space 52, the enlarged portions 44 of the spider 40 will be contacted by the brake shoe 50 and will serve to transmit some of the radial wheel loads directly to the axle 2, thus relieving the side members 6 and 22 of a portion of the total wheel load and thus preventing a total collapse of the wheel.

Figure 4 illustrates a modified arrangement of the outer wheel bearing in the device of Figures 1 and 2 and in accordance with this construction, the reduced diameter portion 5 of the axle 2 is internally threaded to receive the threaded plug 27', which secures the bearing 26 in the same manner as the nut 27 in the construction of Figures 1 and 2. The threaded plug 27' is locked against rotation by means of the locking ring 28, which is held by suitable splines 29, on the end of the reduced diameter portion 5 of the axle 2. The threaded plug 27', is secured to the locking ring 28 by a conventional locking wire 30. The advantage of this construction is that the threaded plug 27' requires less space than the nut 27, thus permitting the bearing 26 to be arranged nearer the line of load application to the side member 22.

While I have illustrated a preferred form of the invention, it is obvious that other modifications coming within the scope of the invention as defined by the appended claims will become apparent to those skilled in the art.

I claim:

1. A wheel and brake assembly comprising an axle, a pair of spaced disc side members rotatably mounted on said axle, a laterally extending annular tire supporting member located between said side members and secured thereto in concentric relation to said axle to form a closed wheel, an annular laterally extending brake drum having its inner surface forming a braking surface and secured to said annular tire supporting member in a manner to form an air space therebetween communicating at each end thereof with the interior of the wheel, radial webs on each of said side members extending within the wheel interior and forming centrifugal pump impeller vanes, and means to admit air to the interior of the wheel adjacent the axis of rotation of one of said side members and means to discharge air from the interior of said wheel located adjacent the outer peripheral portion of the other of said side members, whereby rotation of said wheel causes a flow of air through said air space to reduce the transmission of heat from said brake drum to said tire supporting member.

2. In a wheel and brake assembly, an axle, a pair of spaced disc side members rotatably mounted on said axle, a laterally extending annular tire supporting member located between said side members and secured thereto in concentric relation to said axle to form a closed wheel, an annular laterally extending brake drum located between said side members and having its inner surface forming a braking surface, said brake drum being secured to said tire supporting member in a manner to form an annular air space therebetween having free communication at the ends thereof with the interior of said wheel to allow a free circulation of air through said air space and to isolate a substantial amount of the heat developed in the brake drum from reaching said tire receiving member.

3. The structure as claimed in claim 2, in which said side members are provided with apertures to permit the free access of air to the interior of said wheel.

JEAN A. ROCHÉ.